Figure 10:
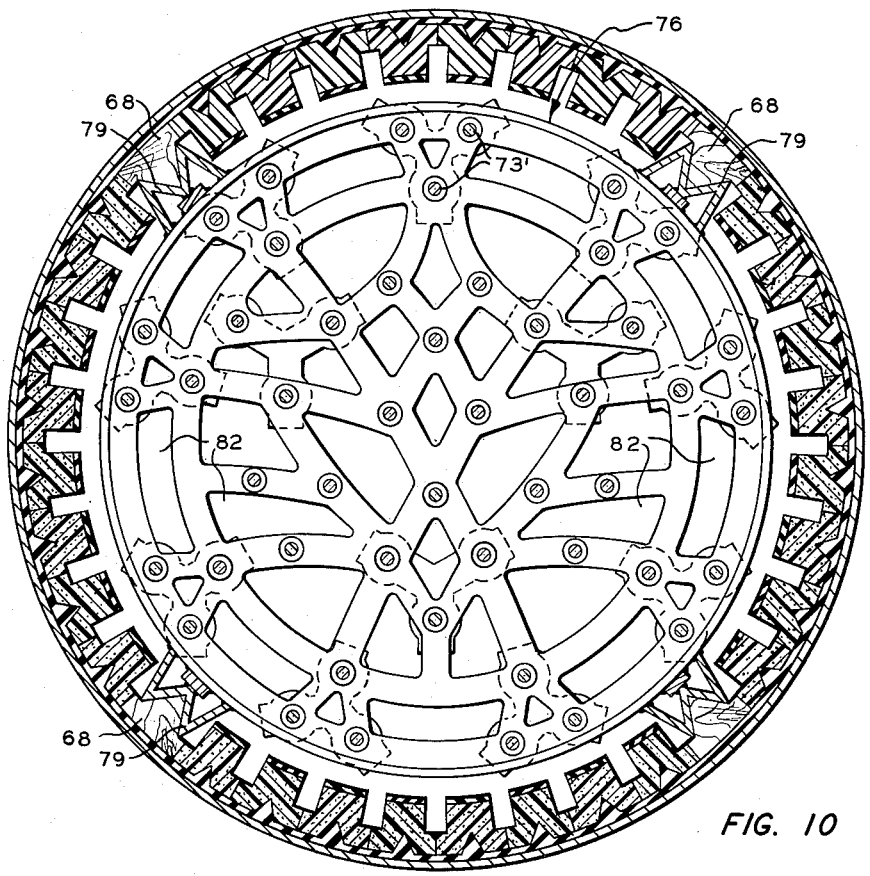

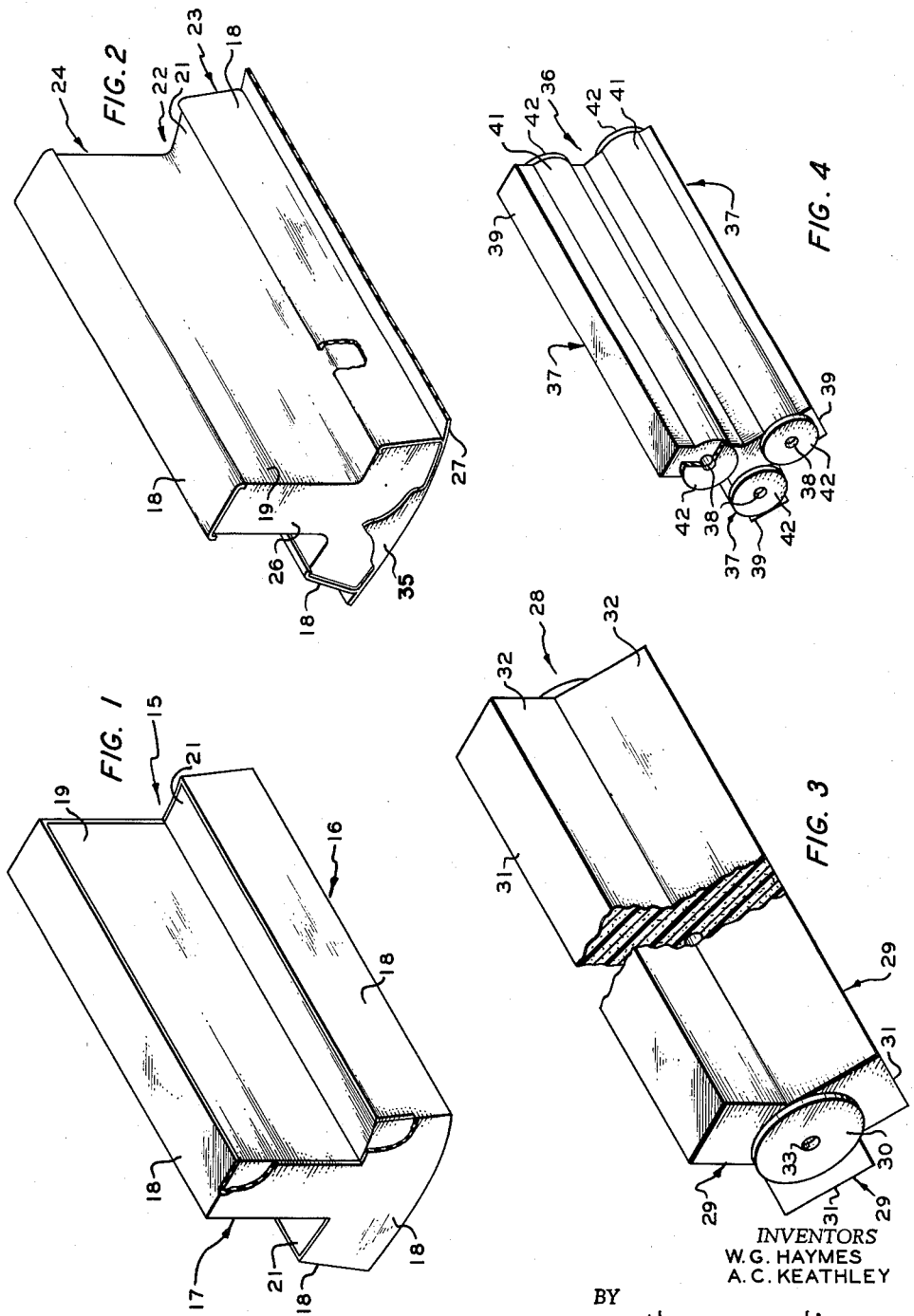

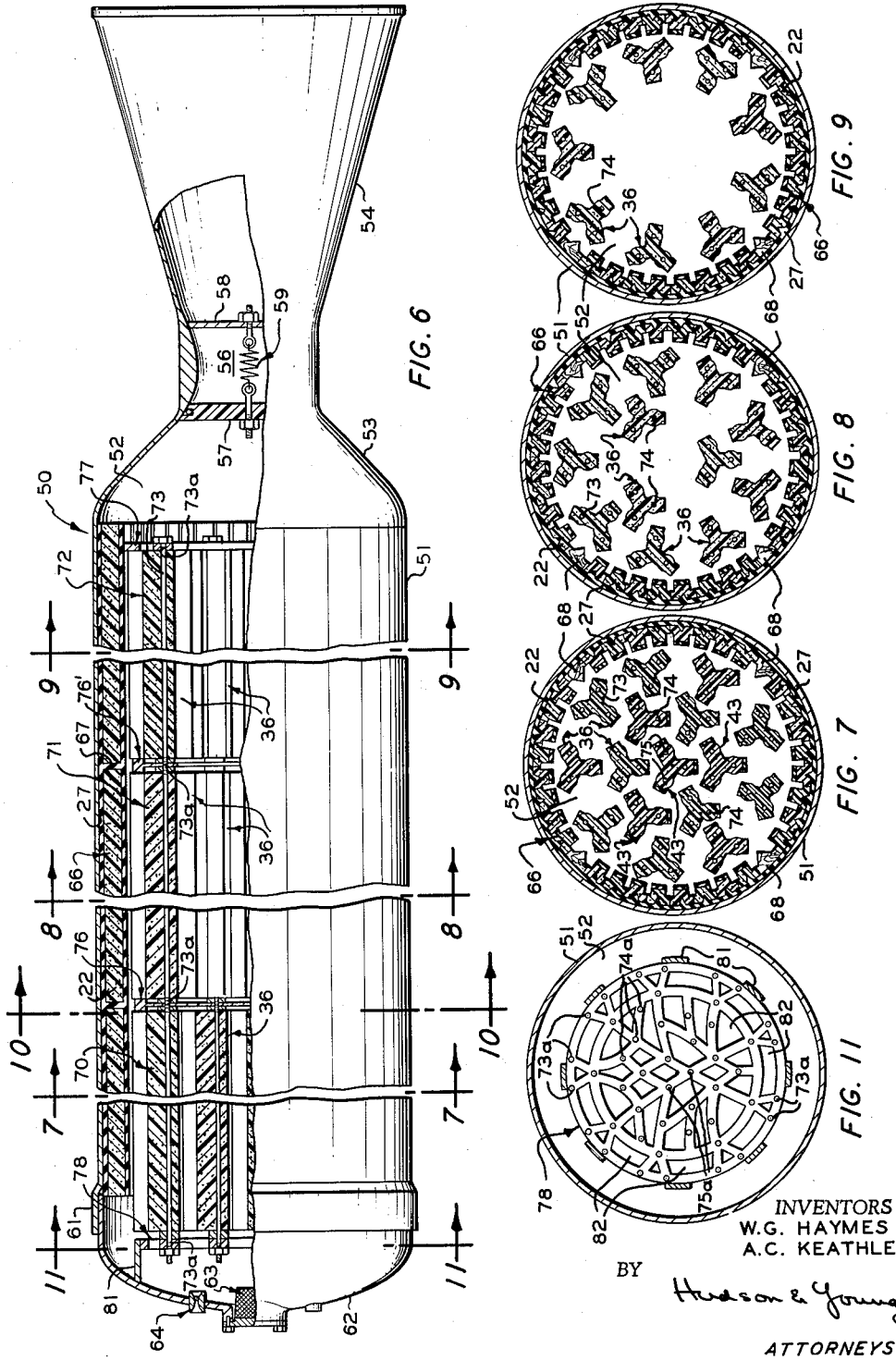

March 27, 1962   W. G. HAYMES ETAL   3,026,674
SOLID PROPELLANT ROCKET MOTOR
Filed Feb. 24, 1958   3 Sheets-Sheet 3

INVENTORS
W.G. HAYMES
A.C. KEATHLEY
BY Hudson & Young
ATTORNEYS

United States Patent Office 3,026,674
Patented Mar. 27, 1962

3,026,674
SOLID PROPELLANT ROCKET MOTOR
William G. Haymes and Anthony C. Keathley, McGregor, Tex., assignors to Phillips Petroleum Company, a corporation of Delaware
Filed Feb. 24, 1958, Ser. No. 717,259
13 Claims. (Cl. 60—35.6)

This invention relates to a rocket motor loaded with a solid propellant charge. In another aspect it relates to a multi-grain solid propellant charge having a novel configuration and adapted to be loaded and supported within a rocket motor in a novel manner. In another aspect it relates to rocket motors of the booster type loaded with an enormous mass of solid propellant having a relatively short duration and adapted to impart a high total impulse. In another aspect it relates to grains of solid propellant having novel configurations and particularly adapted for booster rocket motors.

Booster rocket motors, the type of jet propulsion device with which this invention is concerned, present scale-up problems of fabrication and assembly not found in prior art dealing mainly with small, light-weight propellant grains. These large-scale booster rocket motors utilize multi-grain propellant charges made up from an enormous mass of solid propellant (e.g., 3 tons) designed to impart a high effective thrust (e.g., 130,000–225,000 pounds) and high total impulse (e.g., 1,000,000 sec.).

Because booster rocket motors must reach great velocities in extremely short periods (e.g. 2–6 seconds), with a consequent sudden increase in inertial load upon the propellant charge, it is essential that the trapping means employed securely retain the propellant grains in fixed position during operation. Since multi-grain propellant charges used for booster rocket motors may weigh as much as three tons or more and comprise a plurality of individual rocket grains, e.g., 50–100, weighing, for example, 60 pounds each, the design criteria for the trapping means becomes very important and it is essential that the propellant charge acts for all intents and purposes as a single grain.

Moreover, the trapping means must be so designed that the forces tending to pull the propellant material from the trapping members during operation will be of insufficient magnitude to cause a loss of propellant material, a phenomenon which occurs when a portion of unburned propellant material breaks off from the grain proper and escapes through the exhaust nozzle causing a sharp drop in pressure due to the sudden decrease in burning surface area. These unburned fragments of propellant material may even become lodged on the support grid in the rocket motor combustion chamber with a consequent sharp rise in pressure due to the sudden increase in burning surface area. Thus, there has arisen a need for means of positively supporting and arranging the heavy multi-grain propellant charge in the rocket motor.

Though the trapping means utilized for supporting and arranging multi-grain propellant charges must be ruggedly constructed, it should be light-weight, it should not affect the desired uniform density of the propellant mass nor should it obstruct the free and normal flow of combustion gases out through the exhaust nozzle. Furthermore, such trapping means must be capable of supporting the individual propellant grains in a position such that the great inertial forces acting on the grains will be in the direction that will minimize as much as possible the strains on the grains.

Since the rocket motor casing will be subjected to relatively high temperatures during operation, e.g., 2400–2800° F., the propellant charge should be such as to obviate the need for fabricating the rocket motor casing excessively thick to withstand the high operational temperatures and pressures.

The propellant charge must have a relatively high volumetric loading. To achieve this, there has arisen a need for a grain geometry which will enable different high volumetric loading densities to be obtained without sacrificing various operational characteristics.

Figure 5:
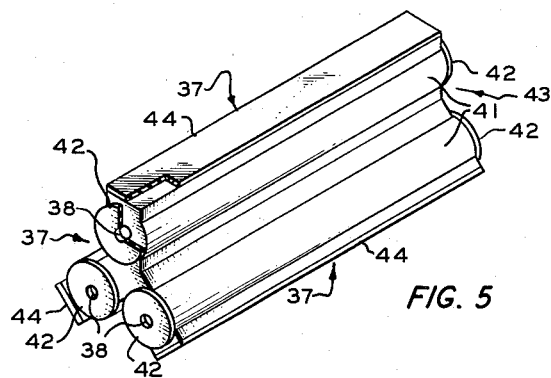

Accordingly, an object of this invention is to provide a novel rocket motor of the booster type loaded with solid propellant. Another object is to provide a multi-grain propellant charge having a novel configuration and adapted to be readily loaded and positively supported in a rocket motor. Another object is to provide a rocket motor of the booster type having an enormous mass of propellant loaded therein adapted to impart a high total impulse and high effective thrust in a relatively short duration. Another object is to provide a multi-grain propellant charge made up from a plurality of novel grains which are structurally strong and capable of withstanding the severe operational forces normally exerted thereon. Another object is to provide a rocket motor loaded with solid propellant in such a manner as to minimize the need for making the rocket motor casing excessively thick in order to withstand the high operational temperatures and pressures. Another object is to provide a rocket motor having a multi-grain propellant charge positively supported in the combustion chamber of the rocket motor so that the forces tending to pull the propellant material from the trapping means during operation will be of insufficient magnitude to cause fracturing or disintegration of the propellant material. Another object is to provide a rocket motor loaded with a propellant charge having a volumetric loading density which can be readily varied to provide a wide range of operational specifications. Other objects and advantages of this invention will become apparent from the following discussion, appended claims, and accompanying drawing in which:

FIGURE 1 is an isometric view in partial section of a cog-shaped grain;
FIGURE 2 is an isometric view in partial section of a modified cog-shaped grain;
FIGURE 3 is an isometric view in partial section of a triform grain;
FIGURE 4 is an isometric view in partial section of another embodiment of a triform grain;
FIGURE 5 is an isometric view in partial section of a further embodiment of a triform grain;
FIGURE 6 is a longitudinal view in elevation and partial section of a booster rocket motor loaded with a multi-grain propellant charge;
FIGURES 7, 8, and 9 are transverse views in elevation and partial section of FIGURE 6 taken along the planes indicated;
FIGURE 10 is a transverse view in elevation of FIGURE 6 taken along the plane indicated illustrating an intermediate charge support plate; and
FIGURE 11 is a transverse view in elevation of FIGURE 6 taken along the plane indicated illustrating a forward or head charge support plate.

Referring to the drawing now, in which like parts have been designated with like reference numerals, and initially to FIGURE 1, a grain 15 of solid propellant is shown having the shape of a cog with a lower base portion 16 and a radial projection portion 17, a transverse section of the grain having the general shape of a T. The base portion 16 of cog grain 15 has a slight curvature as shown. Both ends of cog grain 15 as well as the top of projection portion 17 and the sides of base portion 16 are covered with suitable burning restricting material 18, for example, rubber. Restricting the cog grain 15 in this manner leaves the sides 19 of the projection portion 17 and the top 21 of base portion 16 exposed. These exposed surfaces 19, 21 serve as exposed burning surfaces. As will be discussed in detail hereinafter, a plurality of cog grains 15 are longitudinally and circumferentially contiguously aligned to form a cylindrical liner of solid propellant in a rocket motor with the bottoms of the base portions bonded to the inner wall of the rocket motor casing and the projection portions radiating inwardly.

Referring to FIGURE 2, a modified cog grain 22 is shown having a base portion 23 and a projection portion 24. Like cog grain 15 of FIGURE 1, the sides 19 of projection portion 24 and the top of base portion 23 are exposed to form exposed burning surfaces, whereas the top of projection portion 24 and sides of base portion 23 are similarly covered with burning restricting material 18. The ends 26 of cog grain 22 are shown exposed but, as will be discussed hereinafter in detail, these ends of cog grain 22 can also be restricted, for example, with sponge rubber. The bottom of cog grain 22 is adhesively bonded to a liner 27 which, as will be pointed out hereinafter, is in turn bonded to the inner wall of a rocket motor casing. The liner 27 can have a longitudinally extending rib 35 upon which cog grain 22 is placed and adhesively bonded, the bottom of base portion 23 being shaped to conform to the liner rib. Rib 35 can be merely a thickened portion of liner 27, as shown, or a void can be left between the rib and the casing, in which case a thin cylinder or sheath of metal can be used to encircle the liner, this sheath also being shaped to conform to the base portion of the cog grains, adhesively bonded to the liner, and welded to the casing.

Referring to FIGURE 3, a grain 28 of solid propellant is shown having a triform shape. The three arms 29 of grain 28 radiate outwardly and have their tops 31 and sides 32 exposed to serve as exposed burning surfaces. A circular disk of burning restricting material 30 is adhesively bonded to both ends of triform grain 28, the portions of the ends not covered with restricting material also serving as burning surfaces. Restricting material 30 and triform grain 28 are provided with an axial perforation 33 adapted to receive a metal support rod. A transverse section of grain 28 is trifurcate in shape with each arm preferably spaced about 120° from the adjacent arms. As will be pointed out hereinafter, a plurality of triform grains 28 are longitudinally and spatially supported in a radially symmetrical pattern in a rocket motor.

Referring to FIGURE 4, a modified triform grain 36 is shown with each radiating arm 37 provided with an axial perforation 38. The tops 39 and sides 41 of each radiating arm 37 are exposed to serve as exposed burning surfaces. The sides of each radiating arm 37 can have longitudinally extending ribs or protuberances designed to thicken the arm and compensate for the perforations 38. Each end of each arm 37 is provided with a disk 42 of restricting material adhesively bonded thereto, those portions of the grain's ends being uncovered also serving as burning surfaces. In other respects, triform grain 36 is similar to triform grain 28 of FIGURE 3.

Referring to FIGURE 5, modified triform grain 43 is similar to FIGURE 4 except that the tops of arms 37 are covered with burning restricting material 44. In other respects, triform grain 43 is similar to triform grain 36 of FIGURE 4.

The cog grains of FIGURES 1 and 2 and the triform grains of FIGURES 3, 4 and 5 can be readily extruded in the shapes shown. Before or after the grains are cured, the restricting material can be applied using a suitable adhesive to form a positive and reliable bond therebetween. Both types of grains are structurally strong and provide great latitude in varying the volumetric loading density of the propellant charge. The cog grain of FIGURE 2 is preferred because it has been found that it lessens the tendency of silver formation when a propellant liner is fabricated from a plurality of these grains. The triform grains of FIGURES 4 and 5 are preferred because it has been found that these grains are structurally strong in all directions (i.e., through 360°). Moreover, it has been found that the volumetric loading density of a rocket motor can be readily varied from one end of a combustion chamber to the other by varying the number, types, and arrangement of triform grains while maintaining a radially symmetrical pattern.

Referring to FIGURES 6–11, a rocket motor generally designated 50 is shown having a shell or cylindrical metal casing 51 defining a generally cylindrical combustion chamber 52 having an axial outlet at the aft end thereof. The rear or aft end of casing 51 is reduced or tapered at 53 and is integral with a reaction nozzle 54; alternatively, a separable nozzle can be secured to casing portion 53 by suitable means, such as bolted flanges. Reduced casing portions 53 and 54 define a converging-diverging or DeLaval passage 56. Straddling the throat of passage 56 is a starter disk 57, made of plastic or the like, and a thin metal disk 58, both disks held together by spring means 59. Other well known starter disc arrangements can be substituted for that shown in the drawing.

The other or head end of casing 51 is constructed in the form of a flange 61 and is secured to the head or closure member 62 by any suitable means, such as welding, closure keys, etc. Closure member 62 can be provided with an axial opening in which is positioned a suitable igniter 63, preferably in the form of a frangible container, such as a wire basket or plastic cup, which extends into the head end of the combustion chamber 52. Alternatively, head closure member 62 can be fitted with a plurality of similar smaller auxiliary igniters arranged, for example, in a circular fashion. Igniter 63 can be filled with any suitable ignition material known in the art, for example, black powder, or other pyrotechnic material. Suitable electric-responsive means, such as squibs, matches, etc., can be embedded in the ignition material and connected to suitable electric lead wires which extend from the igniter 63 to a suitable external electric power source. Suitable igniters found to be of particular value in actual practice are disclosed and claimed in the copending application Serial No. 591,340, filed June 14, 1956, by B. R. Adelman. Closure member 62 can also be provided with suitable pressure taps 64 designed to utilize combustion chamber pressure, for example, to actuate auxiliary power equipment.

Disposed within the combustion chamber 52 is a generally cylindrical liner of solid propellant generally designated 66 which comprises a plurality of longitudinally and circumferentially contiguously aligned cog grains, such as cog grains 22 of FIGURE 2. Cog grains 22 may extend the entire length of the combustion chamber 52 or a plurality of longitudinally aligned cog grains can be separated by suitable restricting material, such as sponge rubber 67, between their ends, which material also acts as an expansion joint. Cog grains 22 of propellant liner 66 are adhesively bonded to a cylindrical liner 27 of restricting material which in turn is adhesively bonded to the inner wall of rocket motor casing 51. The projection portions of the cog grains which extend radially inward preferably all have the same length, although it is within the scope of this invention to have some projection portions of circumferentially alternate cog grain longer than those of adjacent cog grains, thereby providing an additional feature by which the volumetric loading density can be increased. Suitable rails 68, made of wood or other non-combustible material, are bolted or otherwise secured to the casing and extend down the length of the combustion chamber 52 between longitudinal sections, e.g., quadrants, of the propellant liner 66. Although we prefer to employ this propellant liner in the preferred embodiment of this invention, it is within the scope of our invention to simply coat the wall of the casing with suitable insulation.

The combustion chamber 52 is loaded with a plurality of tandem propellant charge units or banks comprising head bank 70, intermediate 71, and aft bank 72. Each bank comprises a plurality of longitudinally and spatially aligned triform grains, such as triform grains 36 and 43 of FIGURES 4 and 5, respectively. The triform grains in each bank can vary in number and are all arranged in radially symmetrical patterns, clearly shown in FIGURES 7, 8 and 9, which figures show the volumetric loading density of propellant charge banks 70, 71 and 72, respectively. It is to be noted that the volumetric loading density decreases from the head end of the combustion chamber to the aft end, i.e., the free port area progressively increases. In each bank, nine triform grains 36 are radially symmetrically arranged in an outer cylindrical tier adjacent the propellant liner 66. The grains in this outer cylindrical tier can be supported on and adhesively bonded to common or continuous support rods 73 which extend the entire length of the combustion chamber, each triform grain having three such support rods. The head charge bank 70 has an inner cylindrical tier of six radially symmetrical triform grains, three of which (grains 43) are in longitudinal alignment with the three radially symmetrical triform grains 36 which make up the inner cylindrical tier in the intermediate charge bank 71. The longitudinally aligned triform grains making up the inner cylindrical tiers of charge units 70 and 71 can be similarly supported by common or continuous support rods 74. It is to be noted that the aft charge unit 72 comprises only an outer cylindrical tier of nine triform grains 36. Furthermore, the head charge unit 70 has a single axially aligned or center triform grain 43.

Transversely mounted within the combustion chamber 52 between adjacent charge units are intermediate circular transverse perforated support plates 76 and 76'. A similar aft transverse perforated support plate 77 is mounted in the combustion chamber adjacent the aft end of the aft charge unit 72. Adjacent the head end of head charge unit 70 is a similar head transverse perforated support plate 78. Support plates 76, 76', 77 and 78 can be made of lightweight metal and can be fabricated by stamping so as to provide ports or openings 82 for the passage of combustion gases. Intermediate support plates 76, 76' and aft support plate 77 have peripheral flanges to which are attached a plurality of circumferentially spaced means 79, such as ears, which are adapted to articulate with rails 68. Head support plate 78 is not provided with any ears or the like but rather is provided with a plurality of circumferentially spaced flange members 81 or the like which longitudinally extend toward closure member 62 to which they are welded or otherwise secured. Support plates 76, 76', 77 and 78 are all provided with suitable openings adapted to receive the various support rods. The longitudinally extending support rods 73, supporting the triform grains 36 in the outer cylindrical tiers of all the charge units 70, 71 and 72 pass through suitable openings 73a in each of the support plates 76, 76', 77 and 78. The opposite ends of these support rods 73 are threaded and extend beyond the respective support plates 77, 78 and suitable nuts or the like are fastened on these threaded ends to secure the supported grains in a fixed position. In a similar manner, the support rods 74 supporting the triform grains 36 in the inner cylindrical tier of the head charge bank 70 pass through suitable openings 74a in head support plate 78 and the respective intermediate support plate 76 and are secured thereto in a similar manner with nuts or the like. Those longitudinally aligned grains making up the inner cylindrical tiers of charge units 70 and 71 are similarly supported by common support rods 74 whose ends pass through suitable openings 74a in head support plate 78 and the respective intermediate support plate 76 and fastened thereto in a similar manner with nuts or the like. The center grain 43 of head charge bank 70 is similarly supported by a support rod 75 which is secured to support plates 78 and 76' by nuts or the like.

It is evident that the ears 79 are adapted to articulate with rails 68 so as to facilitate the loading of the charge units 70, 71, 72 into the rocket motor. Each charge unit can be separately loaded in the rocket motor, or two or more, or all, of the charge units can be fastened together in the manner described and loaded into the rocket motor as a whole. After loading the charge units, the head closure member 62 is then affixed to the rocket motor casing so as to close the head end of the rocket motor. It will be apparent that the foregoing loading procedure may be varied and we do not intend to limit our invention to the procedure described. The individual rocket grains can be formed to exact dimensions in automatic machinery and loaded by unskilled labor without affecting the uniformity or rigid construction of the charge units.

Although the drawing illustrates only three tandem propellant charge banks, it is to be understood that a lesser or greater number of such banks can be employed, the particular number depending upon the thrust desired. For a rocket motor having a thrust of about 225,000 pounds, we prefer to employ four tandem charge banks together with a propellant liner of cog grains. The types of triform grains we prefer to employ in this preferred design are those illustrated in FIGURES 4 and 5 and the type of cog grain preferred is that illustrated in FIGURE 2. Both types of triform grains 36 and 43 can be used in some or all of the charge banks, the particular number and arrangement being dependent upon the desired thrust and other operational characteristics.

Preferred propellant charge designs are set forth in Table I, Banks I, II, III and IV being respectively the head bank, head-intermediate bank, aft-intermediate bank, and aft bank. For example, in charge design A, Bank I has a configuration such that its outer cylindrical tier comprises nine triform grains, such as grains 36 of FIGURE 4, its inner cylindrical tier comprises six triform grains, such as grains 43 of FIGURE 5, and it has one center or axial triform grain, such as grain 36 of FIG-

*Table I*

|  | Charge Design | | | |
|---|---|---|---|---|
|  | A | B | C | D |
| Bank I: | | | | |
|    Outer tier | 9 triforms 36 | 9 triforms 36 | 9 triforms 36 | 9 triforms 36. |
|    Inner tier | 6 triforms 43 | 6 triforms 36 | {3 triforms 36 / 3 triforms 43} | {3 triforms 36 / 3 triforms 43}. |
|    Center grain | 1 triforms 36 | 1 triforms 36 | 1 triforms 43 | {3 triforms 43}. |
| Bank II: | | | | |
|    Outer tier | 9 triforms 36 | 9 triforms 36 | 9 triforms 36 | 9 triforms 36. |
|    Inner tier | 3 triforms 36 | 3 triforms 36 | 6 triforms 36 | {3 triforms 36 / 3 triforms 36}. |
|    Center grain | 1 triforms 36 | | | |
| Bank III: | | | | |
|    Outer tier | 9 triforms 36 | 9 triforms 36 | 9 triforms 36 | 9 triforms 36 |
|    Inner tier | 3 triforms 36 | | | |
| Bank IV: | | | | |
|    Outer tier | 9 triforms 36 | 9 triforms 36 | 9 triforms 36 | 9 triforms 36. |

URE 2. In charge design C, the inner tier of Bank I comprises three triform grains like grain 36 of FIGURE 4 circumferentially alternating with three triform grains like grain 43 of FIGURE 5. It is believed readily apparent from Table I that the volumetric loadings of the rocket motors of this invention can be varied over a wide latitude to obtain various operational characteristics.

A typical rocket motor of this invention designed for booster service is described as follows. The overall length of the rocket motor is about 23 feet with a combustion chamber having an inside diameter of about 3 feet and a nozzle having a throat measuring about 15.2 to 16.8 inches. Such a rocket motor has a total empty weight of about 4300 pounds and a loaded weight of about 10,600 pounds, with a propellant charge weighing about 6,000 pounds. The propellant charge comprises a propellant liner comprising about 138 cog grains (arranged in four tandem banks) with four circumferentially spaced rails made of wood extending the length of the charge. The charge comprises in addition four charge banks or units made up from a total of about 50 triform grains. The volumetric loading density of the entire propellant charge is about 73 percent. The igniter system comprises a single axially positioned igniter in the head end of the rocket motor, the igniter comprising a wire basket or cup, the perforations of which are coated with a rubbery or plastic material designed to rupture or fail as a result of the hot combustion products and pressures generated upon firing of the igniter, said container containing about 4000 grams of ½ inch pellets of pyrotechnic material. The propellant has a burning rate in the range of about 0.220 to 0.235 in./sec. at 600 p.s.i. The starter disk employed is fabricated from Micarta 254 or 238 (phenol-formaldehyde laminated materials), and has a thickness of about ¾ to 1 inch; the starter disk is designed to burst at about 250 to 300 p.s.i. The propellant charge is designed to produce an effective chamber pressure of about 780 p.s.i.a. at 70° F. and has a total burning duration of about 4 seconds. During operation, the temperature of the casing should not exceed 500° F. The rocket motor will have a total impulse of about 1,000,000 seconds and an effective thrust in the range of about 227,000 pounds. It is to be understood that the foregoing is merely an illustrative example of a typical rocket motor of this invention proven by static firing tests and in no way is meant to limit this invention.

In operation, igniter 63 is fired by closing a switch in a suitable electric power source. The resulting ignition products propagate through the entire length of combustion chamber 52 and transfer heat to the exposed burning surfaces of the propellant liner 66 and the triform grains 36, 43, raising the temperature thereof to an ignition temperature. Subsequently, the propellant material begins to burn and combustion gases are generated. When the pressure within combustion chamber 52 reaches a starter disk bursting pressure, starter disk 57 functions, for example, by rupturing, and combustion gases are permitted to escape through nozzle passage 56 at a high velocity, thereby imparting thrust to the rocket motor. Ideally, the pressure-time curve of the rocket motor will be essentially plateau-shaped.

The use of a propellant liner fabricated according to our invention results in several real advantages. For example, in addition to increasing the volumetric loading density of the rocket motor, it functions as insulation in protecting the rocket motor casing from the high temperatures generated during operation, obviating the need of employing relatively thick casing to withstand the high temperatures generated. Moreover, it has been found in practice that the propellant liner fabricated from the cog grains (such as that of FIGURE 2) exhibits little tendency to produce slivers of propellant near the end of the burning period, that is at burn-out. Moreover, by separating longitudinally-aligned cog grains with sponge rubber or the like, the effects of temperature induced stresses on the propellant liner are minimized, the sponge rubber serving as an expansion joint. In addition, the particular cog configuration is readily extrudable with presently available extrusion equipment and this type of configuration has a geometry which lends itself to efficient propellant consumption.

The triform grains are also readily extrudable with presently available extrusion equipment and can be easily handled and loaded in the rocket motor. The particular configuration of the triform grains is structurally strong and will withstand the severe operational forces encountered during service. The particular triform configuration enables the rocket motor manufacturer to vary the volumetric loading density of the rocket motor over a very wide latitude, the particular number, type, and arrangement of the triform grains being variable and readily obtained without significantly altering rocket motor hardware.

The charge support system utilizing the idea of bonding the triform grains to support rods positioned between the transverse perforate plates has several real advantages. For example, this support system provides strength capable of meeting the high drag and acceleration loads to which the system is subjected without increasing inert weight. The support system is simple in design and can be economically fabricated, and it facilitates efficient and economical charge assembly. In operation, longitudinal acceleration forces are transmitted to the rocket motor head or closure member and the transverse operational forces are readily transmitted by the perforate plates, ears, and rails to the rocket motor casing.

In reducing our invention to practice by conducting static test firings of specific embodiments of the rocket motors herein described, the efficacy of the novel means we employ to suspend and support the rocket grains has been demonstrated and the objects of our invention achieved. The rocket grains were supported to burn-out instant and the tensile loads and vibration encountered were effectively transmitted to the head and casing of the rocket motor without necessitating the use of heavy or complex hardware to achieve the same, without the loss of propellant material by disintegration of the grains, and without sacrificing the volume of available combustion space or control over the burning area of the propellant material.

The propellant material utilized in fabricating the rocket grains of this invention can be prepared from a variety of known compounding materials. Particularly useful propellant compositions which may be utilized in the practice of this invention are of the rubbery copolymer-oxidizer composite type which are plasticized and worked to prepare an extrudable mass at 130° to 175° F. The copolymer can be reinforced with suitable reinforcing agents such as carbon black, silica, and the like. Suitable oxidizers include the alkali metal, alkaline earth metal, and ammonium salts of nitric perchloric, and chloric acids, such as ammonium nitrate and ammonium perchlorate. Suitable oxidation inhibitors, wetting agents, modifiers, vulcanizing agents, and accelerators can be added to aid processing and to provide for the curing of the extruded propellant grains at temperatures preferably in the range of 170°–185° F. In addition to the copolymer binder and other ingredients, the propellant composition comprises an oxidizer and a burning rate catalyst. The resulting mixture is heated to effect curing of the same.

Solid propellant compositions particularly useful in the preparation of the propellants used in this invention are prepared by mixing the copolymer with a solid oxidizer, a burning rate catalyst, and various other compounding ingredients so that the reinforced binder forms a continuous phase and the oxidizer a discontinuous phase. The resulting mixture is heated to effect curing of the same.

Composite solid propellant compositions preferred in this invention and found to be of particular value in actual practice are those disclosed and claimed in copending applications Serial No. 284,447, filed April 25, 1952, by W. B. Reynolds et al., and Serial No. 561,943, filed January 27, 1956, by W. B. Reynolds et al. The propellant compositions of these copending applications comprise a rubbery copolymer of a heterocyclic nitrogen base compound with a conjugated diene, mixed with a solid oxidizer.

The copolymers utilized as binders in the propellant compositions of said copending applications are preferably formed by copolymerization of a vinyl heterocyclic nitrogen compound with an open chain conjugated diene. The conjugated dienes employed are those containing 4 to 6 carbon atoms per molecule and representatively include 1,3-butadiene, isoprene, 2,3-dimethyl-1,3-butadiene, and the like. The vinyl heterocyclic nitrogen compound generally preferred is a monovinylpyridine or alkyl-substituted monovinylpyridine such as 2-vinyl-pyridine, 3-vinylpyridine, 4-vinylpyridine, 2-methyl-5-vinylpyridine, 5-ethyl-2-vinylpyridine, 2,4-dimethyl-6-vinylpyridine, and the like. The corresponding compounds in which an alpha-methylvinyl (isopropenyl) group replaces the vinyl group are also applicable.

In the preparation of the copolymers, the amount of conjugated diene employed is in the range between 75 and 95 parts by weight per 100 parts monomers and the vinyl heterocyclic nitrogen is in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10-40, preferably in the range of 15 to 25, and may be masterbatched with 5-20 parts of Philblack A, a furnace black, per 100 parts of rubber. Masterbatching refers to the method of adding carbon black to the latex before coagulation and coagulating to form a high degree of dispersion of the carbon black in the rubber. In order to facilitate dispersion of the carbon black in the latex Marasperse-CB, or similar surface active agent, is added to the carbon black slurry or to the water used to prepare the slurry.

The following empirical formulation or recipe generally represents the class of propellant compositions disclosed in said copending applications which are preferred for the preparation of the propellant grains of this invention.

*Table II*

| Ingredient | Parts per 100 parts of rubber | Parts by Weight |
|---|---|---|
| Binder | | 10-25 |
| Copolymer (Bd/MVP) | 100 | |
| Philblack A (a furnace black) | 10-30 | |
| Plasticizer | 10-30 | |
| Silica | 0-20 | |
| Metal oxide | 0-5 | |
| Antioxidant | 0-5 | |
| Wetting agent | 0-2 | |
| Accelerator | 0-2 | |
| Sulfur | 0-2 | |
| Oxidizer (Ammonium nitrate) | | 75-90 |
| Burning rate catalyst | | 0-30 |

Suitable plasticizers useful in preparing these propellant grains include TP–90-B [di-butoxy ethoxy ethoxy)-methane] supplied by Thiokol Corp.; benzophenone; Butarez (liquid polybutadiene); Philrich 5 (a highly aromatic oil); TP–90B (Dibutoxyethoxy formal); ZP–211 (same as TP–90B with low boiling materials removed); and Pentaryl A (monoamylbiphenyl). Suitable silica preparations include a 10–20 micron size range supplied by Davison Chem. Co.; and Hi-Sil 202, a rubber grade material supplied by Columbia-Southern Chem. Corp. A suitable anti-oxidant is Flexamine, a physical mixture containing 25 percent of a complex diarylamine-ketone reaction product and 35 percent of N,N'-diphenyl-p-phenylenediamine, supplied by Naugatuck Chem. Corp. A suitable wetting agent is Aerosol-OT (dioctyl sodium sulfosuccinate), supplied by American Cyanamid Co. Satisfactory rubber cure accelerators include Philcure 113 (N,N-dimethyl-S-tertiary butylsulfenyl dithiocarbamate); Butyl-8 (a dithiocarbamate-type rubber accelerator), supplied by R. T. Vanderbilt Co.; and GMF (quinone dioxime), supplied by Naugatuck Chem. Co. Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze, Milori blue, Turnbull's blue, Chinese blue, new blue, Antwerp blue, mineral blue, Paris blue, Berlin blue, Erlanger blue, foxglove blue, Hamburg blue, laundry blue, washing blue, Williamson blue, and the like. Other burning rate catalysts such as ammonium dichromate, potassium dichromate, sodium dichromate, ammonium molybdate, copper chromite and the like, can also be used.

Propellant compositions found of particular value in the practice of this invention are set forth in Table III.

*Table III*

| Ingredients | Formulations, Total Parts by Weight | | | | |
|---|---|---|---|---|---|
| | A | B | C | D | E |
| Bd/MVP copolymer, 90/10 | 10.31 | 9.68 | | | |
| Bd/MVP copolymer, 85/15 | | | 4.83 | 4.22 | 4.22 |
| Butarez | | | 4.83 | 4.22 | 4.22 |
| Philblack A | 2.32 | 2.18 | 1.93 | | |
| Philblack E | | | | 2.11 | 2.11 |
| Philrich 5 | | | 1.16 | 2.11 | 2.11 |
| Flexamine | 0.31 | 0.29 | 0.29 | 0.25 | 0.25 |
| Zinc Oxide | 0.50 | | 0.48 | | |
| Magnesium Oxide | 2.06 | 0.47 | 0.48 | 0.42 | 0.42 |
| ZP-211 | 2.06 | 1.93 | | | |
| Ammonium nitrate | 85.00 | 79.81 | 86.00 | 81.91 | 81.91 |
| Ammonium dichromate | 4.00 | 3.76 | 5.00 | 0.95 | |
| Milori blue | 2.00 | 1.88 | | 3.81 | 4.76 |

The burning restricting material applied to the cog grains and the triform grains can be made from any of the slow burning materials used for this purpose in rocket art, such as cellulose acetate, ethyl cellulose, butadiene-methylvinylpyridine copolymer, GR–S, and the like. The cylindrical liner to which the cog grains are bonded can also be fabricated from similar material. The burning restricting material and this liner can be adhesively bonded to the propellant by any suitable adhesive.

The igniter material employed can be any suitable pyrotechnic material, such as black powder or the like, and preferably is a pelleted or granular pyrotechnic material disclosed and claimed in copending application, Serial No. 592,995, filed June 21, 1956, by L. G. Herring. The pyrotechnic material disclosed in the latter mentioned copending application comprises a rubbery binder, a solid oxidizer, and powdered metal. Ignition pyrotechnic material of this type found to be of particular value in actual practice is set forth in Table IV.

Table IV

| Ingredients | Formulation, Parts by Weight | |
| --- | --- | --- |
| | A | B |
| Potassium perchlorate | 62.50 | 56.94 |
| Aluminum | 12.50 | 24.26 |
| Boron | 8.65 | |
| Zirconium/nickel alloy (50:50) | 12.50 | 15.04 |
| Ethylcellulose | 3.85 | 2.01 |
| Calcium stearate | | 0.75 |

Variations and modifications of our invention may be made by those skilled in the art without departing from the scope or spirit thereof, and it is to be understood that all matter herein set forth in the discussion and drawings is merely illustrative and does not unduly limit our invention.

We claim:

1. A rocket motor comprising, in combination, a casing defining a combustion chamber, a reaction nozzle secured to the aft end of said casing, and a solid propellant charge loaded within said chamber, said charge comprising a lining of propellant and a plurality of triform-shaped grains of propellant longitudinally and spatially supported within said chamber in a radially symmetrical pattern, said lining of propellant comprising a plurality of longitudinally and circumferentially contiguously aligned cog-shaped grains.

2. A rocket motor comprising, in combination, a casing defining a combustion chamber, a reaction nozzle secured to the aft end of said casing, a longitudinally segmented lining of propellant bonded to the inner wall of that portion of said casing defining said combustion chamber, said lining comprising a plurality of longitudinally and circumferentially contiguous cog-shaped grains of propellant, said cog-shaped grains having inwardly projecting radial portions, the inner ends of which are restricted and the sides of which are exposed, said cog-shaped grains having base portions the sides of which are restricted and the inner surfaces of which are exposed, a plurality of triform-shaped grains of solid propellant longitudinally and spatially aligned within said chamber in a radially symmetrical pattern, each of said triform-shaped grains having radiating arm portions having exposed burning surfaces, each of said arm portions having an axial perforation, and longitudinal support rods passing through said perforations.

3. A rocket motor comprising, in combination, a casing defining a cylindrical combustion chamber, a reaction nozzle secured to the aft end of said casing, a longitudinally segmented lining of propellant bonded to that portion of said casing defining said combustion chamber, said lining comprising a plurality of longitudinally and circumferentially contiguous cog-shaped grains having inwardly projecting radial portions the inner ends of which are restricted and the sides of which are exposed, said cog-shaped grains having base portions bonded to the base portions of adjacent cog-shaped grains, said base portions having their inner surfaces exposed, a plurality of longitudinal charge support rails secured to the inner wall of that portion of said casing defining said combustion chamber, and at least one multi-grain charge bank suspended within said chamber, said charge bank comprising a plurality of triform-shaped grains of solid propellant longitudinally and spatially aligned in a radially symmetrical pattern within said chamber, each of said triform-shaped grains having radiating arm portions with their sides exposed to serve as burning surfaces, each of said arm portions having an axial perforation, support rods passing through said axial perforations, transverse perforate support plates adjacent the ends of said triform-shaped grains, said plates having openings through which said support rods pass and are secured, means attached to the periphery of at least one of said support plates and adapted to articulate with said rails, and means connecting said support rods to the head end of said casing.

4. A rocket motor comprising a generally cylindrical casing defining a cylindrical combustion chamber having a rearwardly disposed axial opening, a head closure member sealing the forward end of said chamber, a reaction nozzle secured to the aft end of said casing and defining a constricted axial exhaust passage aligned with said opening, a longitudinally segmented lining of propellant bonded to that portion of said casing defining said combustion chamber, said lining comprising a plurality of longitudinally and circumferentially contiguous cog-shaped grains having inwardly projecting radial portions, the inner ends of which are restricted and the sides of which are exposed, said cog-shaped grains having base portions bonded to the base portions of adjacent cog-shaped grains, said base portions having their inner surfaces exposed, a plurality of longitudinal charge support rails secured to the inner wall of that portion of said casing defining said combustion chamber, a plurality of multi-grain charge banks arranged in a tandem manner within said combustion chamber, each of said charge banks comprising a plurality of triform-shaped grains of solid propellant longitudinally and spatially arranged in a radially symmetrical pattern, each of said triform-shaped grains having radiating arm portions with their sides exposed to serve as burning surfaces, each of said arm portions having an axial perforation, support rods passing through said axial perforations, first transverse perforate support plates mounted in said combustion chamber between adjacent said charge banks, a second transverse perforate support plate mounted in said chamber adjacent the aft end of that said charge bank loaded in the aft end of said chamber adjacent said axial opening, a third transverse perforate support plate mounted in said chamber adjacent the head end of that said charge bank adjacent said head closure, openings in said support plates to permit passage of said support rods, means attached to the periphery of said first and second support plates and adapted to articulate with said rails whereby lateral forces operating on said charge banks are transmitted to said casing, and means attached to the periphery of said third support plate and to said head closure whereby inertial forces operating upon said charge banks are transmitted to said head closure.

5. The rocket motor according to claim 4 wherein the number of said triform-shaped grains supported in each of said charge banks decreases from the head end of said combustion chamber toward the aft end thereof.

6. The rocket motor according to claim 4 wherein longitudinally aligned triform-shaped grains of adjacent charge banks are supported by the same said support rods.

7. The rocket motor of claim 1 wherein said triform-shaped grain of solid propellant comprises three equally circumferentially spaced arms with exposed sides serving as burning surfaces, restricting material covering a portion of the ends of said grain, and at least one longitudinal perforation extending the length of said grain and passing through said restricting material.

8. The rocket motor of claim 1 wherein said triform-shaped grain of solid propellant comprises three arms circumferentially spaced about 120° from each other, said arms having their sides exposed to serve as burning surfaces, a disc-like layer of restricting material bonded to each end of said grain at the juncture of said arms, and an axial perforation passing through said grain and said restricting material.

9. The rocket motor of claim 1 wherein said triform-shaped grain of solid propellant comprises three equally circumferential spaced arms with exposed sides serving as burning surfaces, a disc-like layer of restricting material bonded to each end of said arm, and a perforation in each of said arms extending the length thereof and passing through said restricting material bonded to the ends thereof.

10. The rocket motor according to claim 9 wherein the sides of each of said arms each have an outwardly protruding longitudinally extending rib in alignment with said perforation in said arm.

11. The rocket motor according to claim 10 wherein the ends of each of said arms is bonded to a layer of restricting material.

12. The rocket motor according to claim 10 wherein said arms are circumferentially spaced about 120° from each other.

13. A rocket motor comprising, in combination, a casing defining a combustion chamber, a reaction nozzle secured to the aft end of said casing, and a solid propellant charge loaded within said chamber, said charge comprising a lining of propellant and a plurality of grains of propellant longitudinally and spatially supported within said chamber in a radially symmetrical pattern, said lining of propellant comprising a plurality of longitudinally and circumferentially contiguously aligned cog-shaped grains.

References Cited in the file of this patent

UNITED STATES PATENTS

| | | |
|---|---|---|
| 2,462,099 | Hickman | Feb. 22, 1949 |
| 2,728,295 | Rubin et al. | Dec. 27, 1955 |
| 2,755,620 | Gillot | July 24, 1956 |
| 2,813,487 | Miller et al. | Nov. 19, 1957 |
| 2,816,418 | Loedding | Dec. 17, 1957 |

OTHER REFERENCES

A Quasi-Morphological Approach to the Geometry of Charges for Solid Propellant Rockets, The Family Tree of Charge Design, by J. M. Vogel, Jet Propulsion, February 1956, pp. 102 to 105.